United States Patent
Bhattacharya

(10) Patent No.: US 9,143,433 B2
(45) Date of Patent: Sep. 22, 2015

(54) ENERGY EFFICIENT AND ENERGY-MANAGED TRAFFIC ENGINEERING SERVICES IN MULTIPROTOCOL LABEL SWITCHING AND GENERALIZED MULTIPROTOCOL LABEL SWITCHING NETWORKS

(71) Applicant: Ciena Corporation, Hanover, MD (US)

(72) Inventor: Somen Bhattacharya, Santa Clara, CA (US)

(73) Assignee: Ciena Corporation, Hanover, MD (US)

( * ) Notice: Subject to any disclaimer, the term of this patent is extended or adjusted under 35 U.S.C. 154(b) by 103 days.

(21) Appl. No.: 14/047,591

(22) Filed: Oct. 7, 2013

(65) Prior Publication Data

US 2015/0098338 A1    Apr. 9, 2015

(51) Int. Cl.
 H04L 1/00       (2006.01)
 H04L 12/759    (2013.01)
 H04L 12/707    (2013.01)
 H04L 12/723    (2013.01)

(52) U.S. Cl.
 CPC ............. H04L 45/028 (2013.01); H04L 45/22 (2013.01); H04L 45/50 (2013.01)

(58) Field of Classification Search
 None
 See application file for complete search history.

(56) References Cited

U.S. PATENT DOCUMENTS

| | | | |
|---|---|---|---|
| 7,158,863 B1 | 1/2007 | Johnson | |
| 8,130,718 B2 | 3/2012 | Shaheen | |
| 8,139,590 B2 * | 3/2012 | Manral | 370/401 |
| 2012/0250580 A1 | 10/2012 | Testa et al. | |
| 2013/0064127 A1 | 3/2013 | Wang et al. | |
| 2013/0070754 A1 * | 3/2013 | Iovanna et al. | 370/351 |

FOREIGN PATENT DOCUMENTS

EP    2166777    *    3/2010

OTHER PUBLICATIONS

International Search Report and Written Opinion—PCT/US2014/059446—ISA/US—Feb. 3, 2015.

* cited by examiner

*Primary Examiner* — Frank Duong
(74) *Attorney, Agent, or Firm* — Clements Bernard PLLC; Christopher L. Bernard; Lawrence A. Baratta, Jr.

(57) ABSTRACT

Provided are methods and apparatus for mitigating traffic loss by using advanced traffic engineering services in a multiprotocol label switching (MPLS) network and/or a generalized multiprotocol label switching (GMPLS) network. Provided is an exemplary method that includes measuring, at a network element, energy utilization of at least one of a line card and a switch fabric card that are configured to carry a traffic engineering (TE) capable link, as well as converting the energy utilization measurement to a normalized energy consumption indicator for the at least one of the line card and the switch fabric card. Further, based on the normalized energy consumption indicator, a route of a label switched path in the MPLS network is optimized so the route avoids the at least one of the line card and the switch fabric card. The provided methods and apparatus advantageously improve throughput, reliability, and availability of MPLS and GMPLS services.

16 Claims, 6 Drawing Sheets

ENERGY EFFICIENT AND ENERGY-MANAGED TRAFFIC ENGINEERING SERVICES IN MULTIPROTOCOL LABEL SWITCHING AND GENERALIZED MULTIPROTOCOL LABEL SWITCHING NETWORKS

FIELD OF DISCLOSURE

This disclosure relates generally to electronics, and more specifically, but not exclusively, to methods and apparatus that reduce energy consumption by using advanced traffic engineering services in a multiprotocol label switching (MPLS) network and/or a generalized multiprotocol label switching (GMPLS) network.

BACKGROUND

During constrained path calculation or path re-optimization processes, conventional MPLS- and GMPLS-based traffic engineered transport services use link bandwidth, service expenses, and delay/jitter as traffic engineering (TE) link metrics. However, hardware components of TE routers and switches (e.g., a network processing unit, a control central processing unit, a hub, a peripheral component interconnect bridge, a memory management unit, a dynamic read only memory, an in/out controller, a micro-controller, a flash device, a field programmable gate array, a switch fabric, a backplane, and an optical connector) along a label switched path (LSP) can consume electrical energy to a point of being overloaded and thus emitting excessive heat. When the routers and switches generate excessive heat, an associated the cooling system (e.g., a fan) also accelerates in an effort to control the rising temperature. In some cases, the cooling system may not be able to reduce the temperature below a safe point, leading to malfunctioning of hardware components in a packet forwarding data path. When the hardware components malfunction, the data path malfunctions, causing data traffic drops, traffic mis-forwarding, and/or loss of traffic.

Thermal effects on data traffic that can result in traffic drops, traffic mis-forwarding, and/or loss of traffic are not conventionally considered a TE link metric, and are not used for constrained path calculation of traffic engineered label switched paths (TE-LSPs). Thus, the impact of these thermal effects is not conventionally considered in evaluating the performance, reliability, and availability of transport LSP services in MPLS and GMPLS traffic engineered networks.

Accordingly, there are long-felt industry needs for methods and apparatus that improve upon conventional methods and apparatus, including methods and apparatus that mitigate thermal effects on data traffic using advanced traffic engineering services in a MPLS network and/or a GMPLS network.

SUMMARY

This summary provides a basic understanding of some aspects of the present teachings. This summary is not exhaustive in detail, and is neither intended to identify all critical features, nor intended to limit the scope of the claims.

Exemplary methods and apparatus for mitigating traffic loss in a multi protocol label switching (MPLS) network are provided. For example, a provided method includes measuring, at a network element, energy utilization of at least one of a line card and a switch fabric card that are configured to carry a traffic engineering (TE) capable link, as well as converting the energy utilization measurement to a normalized energy consumption indicator for the at least one of the line card and the switch fabric card. The method also includes optimizing, based on the normalized energy consumption indicator, a route of a label switched path in the MPLS network so the route avoids the at least one of the line card and the switch fabric card. The optimizing can include rerouting the route using a resource reservation protocol make-before-break procedure or a generalized multiprotocol label switching resource reservation protocol tunnel rerouting. The method can also include calculating a time delay required to accelerate a fan and cool the at least one of the line card and the switch fabric card below a temperature threshold, as well as advertising the time delay to a second network element with a type length value element.

In a further example, the method includes, at the second network element, configuring a point of local repair node to monitor a service quality of the label switched path by checking for the advertised normalized energy consumption indicator, comparing the advertised normalized energy consumption indicator to a threshold value, and triggering, if the advertised normalized energy consumption indicator degrades beyond the threshold value, a protection switchover of the label switched path to a back-up route.

In a further example, provided is a non-transitory computer-readable medium, comprising instructions stored thereon that, if executed by a processor, such as a special-purpose processor, cause the processor to execute at least a part of the aforementioned method. The non-transitory computer-readable medium can be integrated with and/or in a device, such as an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, an aggregation platform extension device, and/or a network element configured to change Operations, Administration, and Maintenance (OAM) attributes.

In another example, provided is an apparatus configured to mitigate traffic loss in a multi protocol label switching (MPLS) network. The apparatus includes means for measuring, at a network element, energy utilization of at least one of a line card and a switch fabric card that are configured to carry a traffic engineering (TE) capable link, means for converting the energy utilization measurement to a normalized energy consumption indicator for the at least one of the line card and the switch fabric card, and means for optimizing, based on the normalized energy consumption indicator, a route of a label switched path in the MPLS network so the route avoids the at least one of the line card and the switch fabric card. The means for optimizing can include rerouting the route using a resource reservation protocol make-before-break procedure or a generalized multiprotocol label switching resource reservation protocol tunnel rerouting.

In a further example, the apparatus includes means for advertising the normalized energy consumption indicator to a second network element with a type length value element. The apparatus can also include means for calculating a time delay required to accelerate a fan and cool the at least one of the line card and the switch fabric card below a temperature threshold, and means for advertising the time delay to a second network element with a type length value element.

At least a part of the apparatus can be integrated in a semiconductor die. Further, at least a part of the apparatus can be integrated with and/or in a device, such as an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, an aggregation platform extension device, and/or a network element configured to change Operations, Administration, and Maintenance (OAM) attributes. In a further example, provided is a non-transitory computer-readable medium, comprising instructions stored thereon that, if executed by a lithographic device, cause the lithographic device to fabricate at least a part of the apparatus.

In another example, provided is an apparatus configured to mitigate traffic loss in a multi protocol label switching (MPLS) network, including a processor configured to measure, at a network element, energy utilization of at least one of a line card and a switch fabric card that are configured to carry a traffic engineering (TE) capable link, to convert the energy utilization measurement to a normalized energy consumption indicator for the at least one of the line card and the switch fabric card, and to optimize, based on the normalized energy consumption indicator, a route of a label switched path in the MPLS network so the route avoids the at least one of the line card and the switch fabric card. The optimizing can include rerouting the route using a resource reservation protocol make-before-break procedure or a generalized multiprotocol label switching resource reservation protocol tunnel rerouting.

In a further example, the processor is further configured to advertise the normalized energy consumption indicator to a second network element with a type length value element. The processor can also be configured to estimate, approximately calculate, and/or calculate a time delay required to accelerate a fan and cool the at least one of the line card and the switch fabric card below a temperature threshold, as well as to advertise the time delay to a second network element with a type length value element.

At least a part of the apparatus can be integrated on a semiconductor die. Further, at least a part of the apparatus can be integrated with a device, such as an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, an aggregation platform extension device, and/or a network element configured to change Operations, Administration, and Maintenance (OAM) attributes. In a further example, provided is a non-transitory computer-readable medium, comprising instructions stored thereon that, if executed by a lithographic device, cause the lithographic device to fabricate at least a part of the apparatus.

The foregoing broadly outlines some of the features and technical advantages of the present teachings in order that the detailed description and drawings can be better understood. Additional features and advantages are also described in the detailed description. The conception and disclosed embodiments can be readily utilized as a basis for modifying or designing other structures for carrying out the same purposes of the present teachings. Such equivalent constructions do not depart from the technology of the teachings as set forth in the claims. The novel features that are characteristic of the teachings, together with further objects and advantages, are better understood from the detailed description and the accompanying figures. Each of the figures is provided for the purpose of illustration and description only, and does not limit the present teachings.

BRIEF DESCRIPTION OF THE DRAWINGS

The accompanying drawings are presented to describe examples of the present teachings, and are not limiting.

Figure 1:
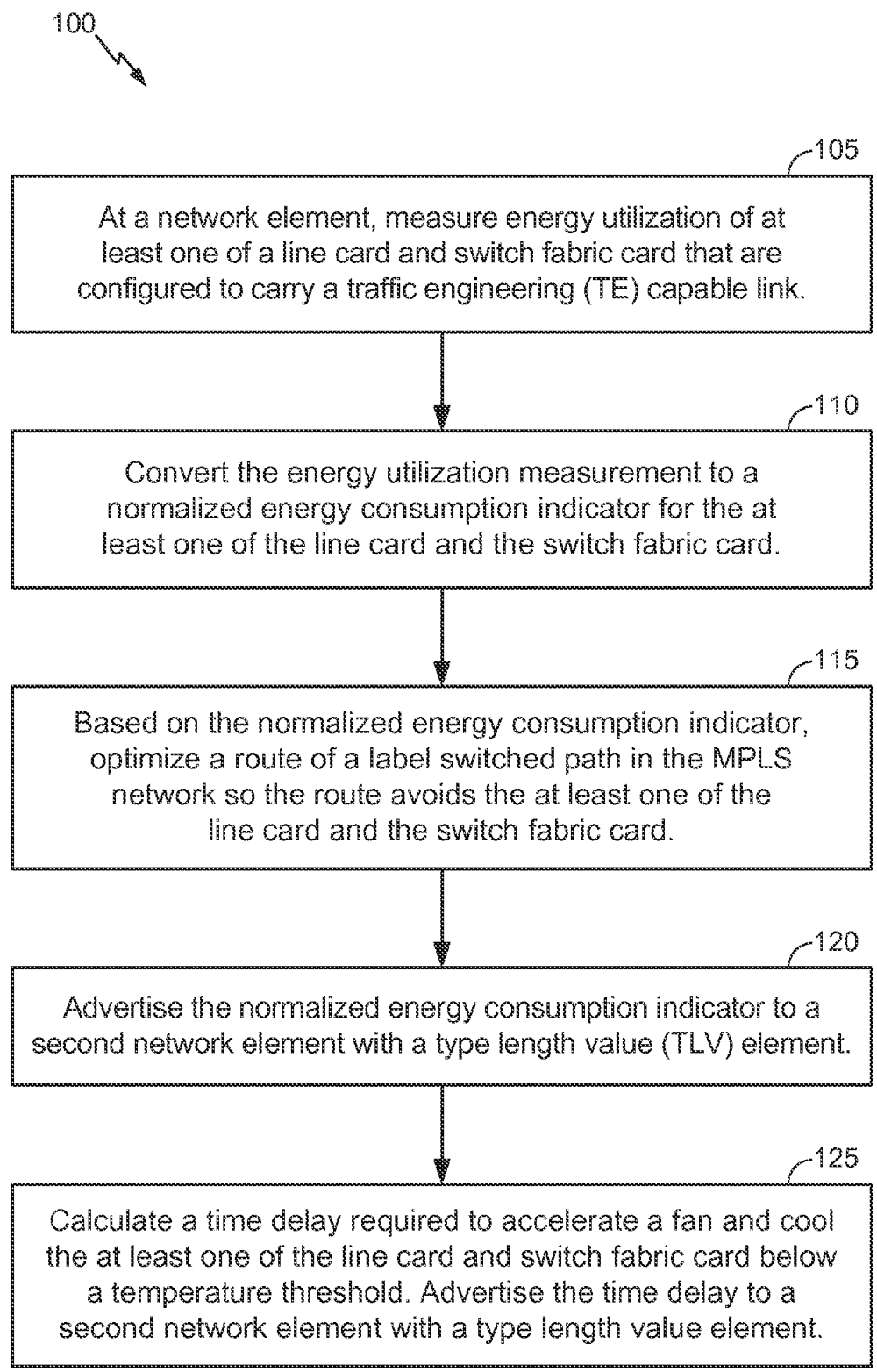
FIG. 1 depicts an exemplary method for mitigating traffic loss in a multi protocol label switching (MPLS) and/or generalized multi protocol label switching (GMPLS) network.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Introduction

Provided are methods and apparatus for mitigating thermal effects on data traffic by using advanced traffic engineering services in a multiprotocol label switching (MPLS) network and/or a generalized multiprotocol label switching (GMPLS) network. The methods and apparatus provide a mechanism to monitor a energy utilization of a line card and/or a switch fabric card that are configured to carry a traffic engineering (TE) capable link, and to propagate the energy utilization information across an interior gateway protocol-traffic engineering (IGP-TE) network in a form of a normalized energy consumption factor.

In an example, provided is a method for mitigating traffic loss in an MPLS network. The method includes measuring, at a network element, energy utilization of a line card and/or a switch fabric card that are configured to carry a TE-capable link, as well as converting the energy utilization measurement to a normalized energy consumption indicator line card and/or the switch fabric card. Further, based on the normalized energy consumption indicator, a route of a label switched path in the MPLS network is optimized so the route avoids the line card and/or the switch fabric card.

The exemplary apparatuses and methods disclosed herein advantageously address the long-felt industry needs, as well as other previously unidentified needs, and mitigate shortcomings of the conventional methods and apparatus. For example, an advantage provided by the disclosed apparatuses and methods herein is an improvement in throughput, reliability, and availability of traffic engineered MPLS and GMPLS transport services over conventional devices. The disclosed apparatuses and methods also improve overall energy efficiency of the traffic engineered MPLS and GMPLS network, since data path re-optimization policy re-routes label switch paths away from less energy efficient TE Node(s) and/or TE Link(s), thereby reducing energy consumption of those nodes and/or links to increasing energy efficiency.

Another advantage is that the provided methods and apparatuses extend the traffic engineering services supported by Internet Engineering Task Force (IETF) standards OSPFv2-TE (RFC 3630), OSPFv3-TE (RFC 5329), IS-IS-TE (RFC 5305), GMPLS-OSPF-TE (RFC 4203), and GMPLS-ISIS-TE (RFC 5307) (the content of each are incorporated by reference herein in their entireties). The provided methods and apparatuses also extend existing OSPF-TE, ISIS-TE, GMPLS-OSPF-TE and GMPLS-ISIS-TE protocol operations with optional TE-Node attribute TLV(s) and TE-Link attribute TLV(s) that cause no interoperability issues, since the TE-node Attribute TLVs and TE-Link Attribute TLVs are exchanged between two consenting OSPF-TE or ISIS-TE capable neighbors.

A further advantage is that the provided methods and apparatuses do not add any additional scaling or performance overhead since a TE-LSA protocol advertisement is triggered only when the measured energy efficiency change crosses a configured threshold for TE-Nodes and/or TE-Links. Also, the provided methods and apparatuses do not impose any additional security threats other than those already applicable for OSPF-TE, ISIS-TE, GMPLS-OSPF-TE, and GMPLS-ISIS-TE.

The provided methods and apparatuses also benefit green energy networks, including data center and mobile backhaul networks where energy efficiency is of utmost importance, by routing data traffic away from network elements having high thermal loads. The disclosed methods and apparatuses monitor energy consumption in real time and can rapidly adjust a data route (e.g., a path of a label switched path) in response to protect a customer and/or a provider's transport services from abrupt failure due to excessive thermal loads.

Exemplary embodiments are disclosed in this application's text and drawings. Alternate embodiments can be devised without departing from the scope of the invention. Additionally, conventional elements of the current teachings may not be described in detail, or may be omitted, to avoid obscuring aspects of the current teachings.

As used herein, the term "exemplary" means "serving as an example, instance, or illustration." Any embodiment described as "exemplary" is not necessarily to be construed as preferred or advantageous over other embodiments. Likewise, the term "embodiments of the invention" does not require that all embodiments of the invention include the discussed feature, advantage, or mode of operation. Use of the terms "in one example," "an example," "in one feature," and/or "a feature" in this specification does not necessarily refer to the same feature and/or example. Furthermore, a particular feature and/or structure can be combined with one or more other features and/or structures. Moreover, at least a portion of the apparatus described hereby can be configured to perform at least a portion of a method described hereby.

It should be noted that the terms "connected," "coupled," or any variant thereof, mean any connection or coupling, either direct or indirect, between elements, and can encompass a presence of an intermediate element between two elements that are "connected" or "coupled" together via the intermediate element. Coupling and/or connection between the elements can be physical, logical, or a combination thereof. As employed herein, elements can be "connected" or "coupled" together, for example, by using one or more wires, cables, and/or printed electrical connections, as well as by using electromagnetic energy. The electromagnetic energy can have wavelengths in the radio frequency region, the microwave region and/or the optical (both visible and invisible) region. These are several non-limiting and non-exhaustive examples.

It should be understood that the term "signal" can include any signal such as a data signal, audio signal, video signal, multimedia signal, analog signal, and/or digital signal. Information and signals can be represented using any of a variety of different technologies and techniques. For example, data, an instruction, a process step, a command, information, a signal, a bit, and/or a symbol described in this description can be represented by a voltage, a current, an electromagnetic wave, a magnetic field and/or particle, an optical field and/or particle, and any combination thereof.

Any reference herein to an element using a designation such as "first," "second," and so forth does not limit the quantity and/or order of those elements. Rather, these designations are used as a convenient method of distinguishing between two or more elements and/or instances of an element. Thus, a reference to first and second elements does not mean that only two elements can be employed, or that the first element must necessarily precede the second element. Also, unless stated otherwise, a set of elements can comprise one or more elements. In addition, terminology of the form "at least one of: A, B, or C" used in the description or the claims can be interpreted as "A or B or C or any combination of these elements."

The terminology used herein is for the purpose of describing particular embodiments only and is not intended to be limiting. As used herein, the singular forms "a," "an," and "the" are intended to include the plural forms as well, unless the context clearly indicates otherwise. Further, the terms "comprises," "comprising," "includes," and "including," when used herein, specify a presence of stated features, integers, steps, operations, elements, and/or components, but do not preclude the presence and/or addition of one or more other features, integers, steps, operations, elements, components, and/or groups thereof.

The following acronyms may be used herein:
ARMA=Auto Regressive Moving Average
CE=customer edge
CMCD=Congestion Management Capability Descriptor
CSPF=constrained shortest path first
DOS=denial of service (e.g., a denial of service attack)
EEMCD=Energy Efficiency Management Capability Descriptor
ER=edge router
EWMA=Exponential Weighted Moving Average
GMPLS=generalized multiprotocol label switching
IETF=internet engineering task force
IGP-TE=interior gateway protocol-traffic engineering
IP=internet protocol
IS-IS=Intermediate System to Intermediate System
ISIS-TE=intermediate system to intermediate system-traffic engineering
LCF=Link Level Congestion Factor
LDP=label distribution protocol
LEEF=Link Level Energy Efficiency Factor
LSA=Link State Advertisement
LSP=label switched path or Link State Packet
L2=layer two
L3=layer three
MPLS=multi protocol label switching
NCF=Node Level Congestion Factor
NE=network element
NEEF=Node Level Energy Efficiency Factor
NMS=network management system
OAM&P=operations, administration, maintenance, and provisioning
OSPF=Open Shortest Path First
OSPF-TE=open shortest path first-traffic engineering
OTN=optical transport network
PCE=path computation element
PE=provider edge
PLCI=Percentage Link Level Congestion Indicator PLEEI=Percentage Link Level Energy Efficiency Indicator
PLR=point of local repair
PNCI=Percentage Node Level Congestion Indicator
PNEEI=Percentage Node Level Energy Efficiency Indicator
PQCI=Percentage Queue Level Congestion Indicator
PSN=packet switched network
QCF=Queue Level Congestion Factor
QoS=quality of service
RFC=request for comment
RSVP-TE=resource reservation protocol-traffic engineering
SDH=synchronous digital hierarchy
SONET=synchronous optical network
TE=traffic engineering
TE-LSA=traffic engineering-link state advertisement
TE-LSDB=traffic engineering-link state database(s)
TLV=type length value
VPN=virtual private network The term "traffic engineering" (TE) describes: mapping data traffic flows through a physical topology of a data network to optimize performance; mapping data traffic flows in a manner to efficiently use data network bandwidth; rerouting traffic in response to a single failure or multiple failures; and/or controlling a path by which a packet travels to maximize data traffic throughput through the data network. The apparatus and methods described herein enable a network operator performing TE to move data traffic flow away from a shortest path to a potentially more reliable physical path in the data network.

The following documents are incorporated by reference herein in their entireties: IETF RFC3945—Generalized Multi-Protocol Label Switching (GMPLS) Architecture; IETF RFC4202—Routing Extensions in Support of Generalized Multi-Protocol Label Switching (GMPLS); IETF RFC4203—OSPF Extensions in Support of Generalized Multi-Protocol Label Switching (GMPLS); IETF RFC5305—IS-IS Extensions for Traffic Engineering; and IETF RFC5307—IS-IS Extensions in Support of Generalized Multi-Protocol Label Switching (GMPLS).

DESCRIPTION OF THE FIGURES

FIG. 1 depicts an exemplary method 100 for mitigating data traffic loss in a multi protocol label switching (MPLS) network. The method 100 can be performed by the apparatus described hereby, such as the apparatus depicted in FIGS. 2-5. The method 100 enables a TE network to react and respond to thermal effects on data traffic that can result in traffic drops, traffic mis-forwarding, and/or loss of traffic. The method 100 also enables the TE network to protect customer and service provider's transport services from data loss due to the thermal effects. The method 100 enables the TE networks to monitor energy utilization in real time and to localize impact of a thermal overload by re-routing customer services through an alternate and stable portion of the network. The method 100 can be used to protect transport layer MPLS/GMPLS label switched paths (LSPs), level 2 virtual private network (L2-VPN) services, and/or level 3 virtual private network (L3-VPN) services carried over label distribution protocol (LDP)-signaled pseudo-wires.

Switches such as MPLS and GMPLS switches have a data-plane that is typically de-coupled from a control-plane. However, in the method 100, the control plane proactively monitors energy consumption of constituent components of a network element. Thus, the method 100 uses the control plane to convert the energy utilization measurement to a normalized energy consumption indicator.

In step 105, at a network element, energy consumption of at least one of a line card and a switch fabric card that are configured to carry a traffic engineering (TE) capable link is monitored. The control plane hardware and software of a routers and/or a switch proactively monitors the electrical energy consumption (e.g., by monitoring a power supply voltage) and/or thermal energy emission (e.g., by measuring temperature of a component) of internal and peripheral parts of the router and/or the switch. Network element components whose energy consumption and/or thermal energy emission can be monitored include at least one of a network processing unit, a control central processing unit, a hub, a peripheral component interconnect bridge, a memory management unit, a dynamic read only memory, an in/out controller, a microcontroller, a flash device, a field programmable gate array, a switch fabric, a backplane, and an optical connector (each of which can be integrated with a voltage sensor and/or temperature sensor for monitoring a voltage and/or temperature of the associated network element component).

In step 110, the measured energy utilization is converted to a normalized energy consumption indicator for the at least one of the line card and the switch fabric card. In an example, when the normalized energy consumption indicator value shows that energy efficiency is 100%, the corresponding data path is considered to have maximum energy efficiency in the particular network.

In step 115, based on the normalized energy consumption indicator, a route of a label switched path in the MPLS network is optimized so that the route avoids the at least one of the line card and the switch fabric card. The optimization avoids the impact of excessive energy consumption in a NE by re-routing customer services (e.g., a label switched path, tunnel, and the like) through an alternate portion of the network that is stable and using less energy.

For example, when a first NE has a high normalized energy consumption indicator, an end-to-end path using a second NE having a relatively lower normalized energy consumption indicator can be considered more optimal. Head-end TE routers can re-optimize and re-route an existing MPLS and/or GMPLS LSP away from a TE link using a NE that has a high normalized energy consumption indicator, based on a TE policy when there is a TE network resource re-optimization or a TE LSP's path re-optimization policy in effect. For example, the head-end TE routers can determine an optimal label switched path, such that total energy efficiency of path from end-to-end does not exceed a required threshold. As another example, the head-end TE routers can determine an optimal label switched path, such that energy efficiency of none of the TE-Nodes or TE-Links along the end-to-end path exceed a threshold.

To compare the energy efficiency of multiple path(s), the normalized energy consumption indicator values for each of the paths can be compared to determine which path is more energy efficient. For new MPLS and/or GMPLS label switched path setup requests, the TE router at head-end computes an LSP path that avoids a TE link having high energy consumption by considering the respective normalized energy consumption indicator as an additional path constraint. Alternately, a PCE-based distributed path computation server/client network can also collect the normalized energy consumption indicator information of the TE networks and use the normalized energy consumption indicator as a path constraint for an LSP. In the case of LDP-signaled dynamic multi-segment pseudo-wire(s), the normalized energy consumption indicator can be used as a constraint against path selection or path re-optimization for dynamic multi-segment pseudo-wires. Optimization can be enhanced by using an exceeding of a thermal threshold for a reactive action (e.g., cooling system changes, cooling fan speed changes) to trigger path selection or path re-optimization.

The label switched path re-route can be made over alternate paths or by a local repair via protection switching. The optimizing can include rerouting the route using a resource reservation protocol make-before-break procedure or a generalized multiprotocol label switching resource reservation protocol label switched path rerouting. An MPLS and/or GMPLS label switched path can be re-routed over more optimal paths using Make-Before-Break procedures of RSVP-TE or GMPLS-RSVP-TE LSP rerouting as described in IETF RFCs 3209 and 3473.

In the case of protected TE LSPs (e.g., Fast reroute, IETF RFC 4090, and the like), a PLR (Point of Local Repair) node can be configured to monitor the label switched path's service quality by listening for normalized energy consumption indicator advertisements described hereby. The PLR node can determine if the label switched path's service quality has degraded below a pre-defined threshold normalized energy consumption indicator value. The PLR node can trigger a protection switchover of the label switched path to its backup route, if the service quality of the label switched path has degraded beyond the tolerance level.

In step 120, the normalized energy consumption indicator is advertised to a second network element with a type length value (TLV) element. The normalized energy consumption indicator is used as a TE link attribute and updated in TE link state databases (TE-LSDB) maintained by the TE-capable routers and/or switches. Routers and/or switches having a role of PLR can also use the TE link's normalized energy consumption indicator information as an indication of TE link quality degradation and trigger a local repair via protection switching.

In step 125, a time delay required to accelerate a fan and cool the at least one of the line card and the switch fabric card below a temperature threshold is determined (e.g., by estimating), based on the normalized energy consumption indicator. The time delay can be advertised to a second network element with a type length value element. When the network has open shortest path first-traffic engineering (OSPF-TE) or intermediate system to intermediate system-traffic engineering (ISIS-TE) protocol enabled, the normalized energy consumption indicator and queue draining delay parameters can be advertized as measured TE link metric(s) to OSPF or IS-IS neighbors. The measured TE link metric(s) can be advertised in a sub-TLV(s) of an optional TLV by extending OSPFv2 TE-LSA and/or OSPFv3's TE-LSA. Further, IS-IS's TE TLVs can also be extended to carry the measured TE link metric(s) in sub-TLV(s) of an optional TLV. Whether or not an OSPF-TE or ISIS-TE speaking router will advertise the link attribute TLV(s) via TE-LSA to a neighbor can be decided based on an OSPF/IS-IS router capability discovery performed during a neighbor relationship establishment. After receiving the receiving the measured TE link metric(s), the OSPF and/or IS-IS routers can update these link parameters in their TE link State Database (TE-LSDB).

Figure 2:
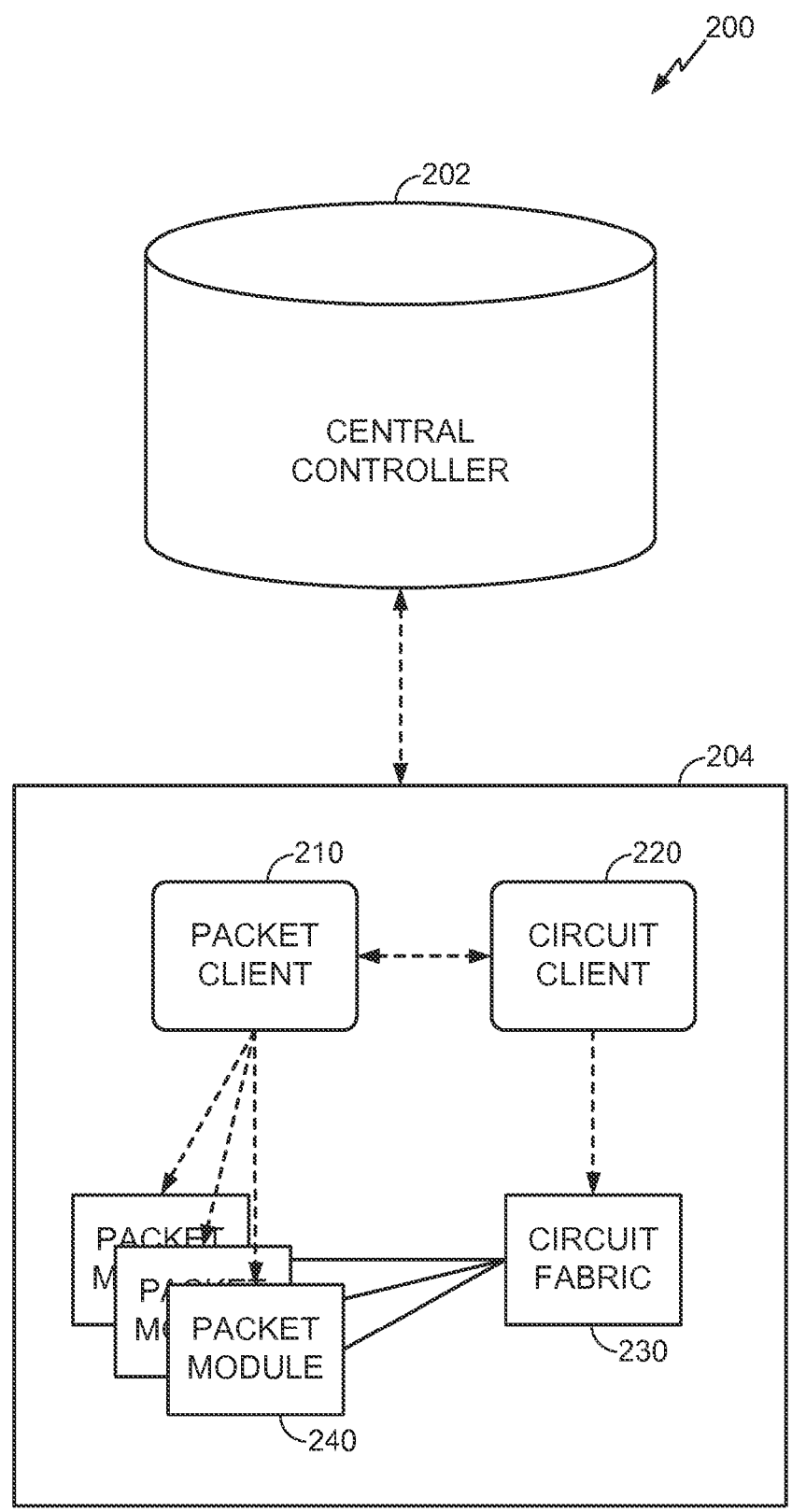
FIG. 2 depicts an exemplary optical transport network (OTN) system including a central controller.

FIG. 2 depicts an exemplary OTN system 200 including a central controller 202. Here, the central controller 202 can be configured to handle packet and circuit control, as well as to handle packet control with a separate control system for circuit control. The central controller 202 is communicatively coupled to an OTN 204 and provides control functionality, such as managing flow and/or forwarding tables of the OTN 204. Additionally, the central controller 202 can also maintain the flow or forwarding tables of CE routers as well.

The OTN 204 includes hardware, software, and/or firmware configured to manage, switch, etc. circuit and packet data. For example, the OTN 204 can include a packet client module 210, a circuit client module 220, a circuit fabric module 230, and a packet module 240. Collectively, the packet client module 210, the circuit client module 220, the circuit fabric module 230, and the packet module 240 are configured to interface with the OTN 204 and to switch data at Layers 0, 1, 2, and/or 3. For example, the packet client module 210 can include a data interface port (e.g., an Ethernet interface). The circuit client module 220 can include an optical interface port (e.g., SONET, SDH, OTN, and the like.). The circuit fabric module 230 can include a circuit switching fabric configured to switch SONET, SDH, OTN, and the like. The packet module 240 can include a packet switch configured to switch Layer 2 and/or 3 traffic. The modules 210, 220, 230, 240 and the central controller 202 can be coupled therebetween.

Figure 3:
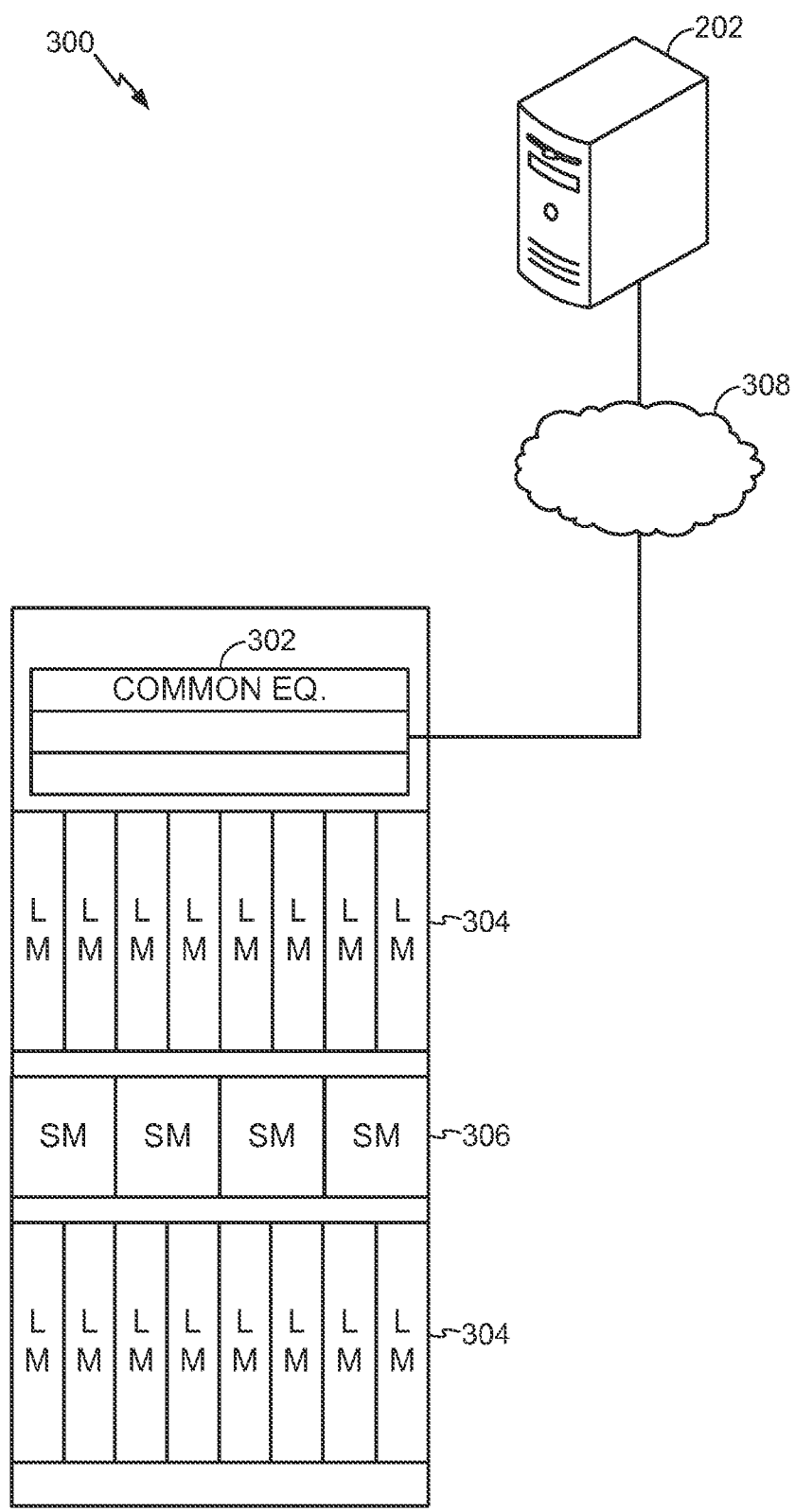
FIG. 3 depicts an exemplary network element within the OTN of FIG. 2.

FIG. 3 depicts an exemplary network element (NE) 300 within the OTN 204. In an exemplary embodiment, the NE 300 consolidates functionality of a multi-service provisioning platform (MSPP), digital cross connect (DCS), Ethernet and Optical Transport Network switch, dense wave division multiplexed (DWDM) platform, and the like into a single, high-capacity intelligent switching system providing Layer 0, 1, and 2 consolidation. In another exemplary embodiment, the NE 300 can include a SONET add/drop multiplexer (ADM), an SDH ADM, an OTN ADM, a multi-service provisioning platform (MSPP), a digital cross-connect (DCS), and the like. Generally, the NE 300 includes common equipment 302, line modules (LM) 304, and switch modules (SM) 306.

The common equipment 302 can include a power supply (e.g., having a voltage sensor and/or temperature sensor); a control module (such as the control modules 400a, 400b); operations, administration, maintenance, and provisioning (OAM&P) access; and the like. The common equipment 302 can be coupled to the central controller 202 through a data communication network 308. Further, the common equipment 302 can be coupled to a management system other than the central controller 202 through the data communication network 308. The management system can include a network management system (NMS), element management system (EMS), and/or the like. Additionally, the common equipment 302 can include a control plane processor configured to operate a control plane, the LM 304, and the SM 306, as well as to execute at least a part of a method described herein.

The line modules 304 can be coupled to the switch modules 306, such as through a backplane, mid-plane, and/or the like. The line modules 304 are configured to provide ingress and egress to the switch modules 306, and are configured to provide interfaces for the NE 300 and services described herein. In an exemplary embodiment, the line modules 304 can form ingress and egress switches with the switch modules 306 as center stage switches for a three-stage switch. The line modules 304 can include optical transceivers, such as, for example, 1 Gb/s (GbE PHY), 2.5 Gb/s (OC-48/STM-1, OTU1, ODU1), 10 Gb/s (OC-192/STM-64, OTU2, ODU2, 10 GbE PHY), 40 Gb/s (OC-768/STM-256, OTU3, ODU3, 40 GbE PHY), 100 Gb/s (OTU4, ODU4, 100 GbE PHY), etc. Further, the line modules 304 can include a plurality of optical connections per module and each module can include a flexible rate support for any type of connection, such as, for example, 155 Mb/s, 622 Mb/s, 1 Gb/s, 2.5 Gb/s, 10 Gb/s, 40 Gb/s, and 100 Gb/s. The line modules 304 can include a DWDM interface, a short reach interface, and the like, and can connect to a remote NE, end client device, an edge router, and the like. From a logical perspective, the line modules 304 provide ingress and egress ports to the NE 300, and each line module 304 can include one or more physical ports.

The switch modules 306 are configured to switch services between the line modules 304. For example, the switch modules 306 can provide wavelength granularity (Layer 0 switching), SONET/SDH granularity such as Synchronous Transport Signal-1 (STS-1), Synchronous Transport Module level 1 (STM-1), Virtual Container 3 (VC3), etc.; OTN granularity such as Optical Channel Data Unit-1 (ODU1), Optical Channel Data Unit-2 (ODU2), Optical Channel Data Unit-3 (ODU3), Optical Channel Data Unit-4 (ODU4), Optical channel Payload Virtual Containers (OPVCs), etc.; Ethernet granularity; Digital Signal n (DSn) granularity such as DS0, DS1, DS3, etc.; and the like. Specifically, the switch modules 306 can include both Time Division Multiplexed (TDM) (i.e., circuit switching) and packet switching engines. The switch modules 306 can include redundancy as well (e.g., 1:1, 1:N, etc).

The OTN 204 can include other components which are omitted for simplicity, and that the systems and methods described herein are contemplated for use with different network elements, such as the exemplary NE 300. For example, in another exemplary embodiment, the OTN 204 does not include the switch modules 306, but rather has the corresponding functionality in the line modules 304 in a distributed fashion. For the OTN 204, other architectures providing ingress, egress, and switching therebetween are also contemplated for the systems and methods described herein.

Figure 4:
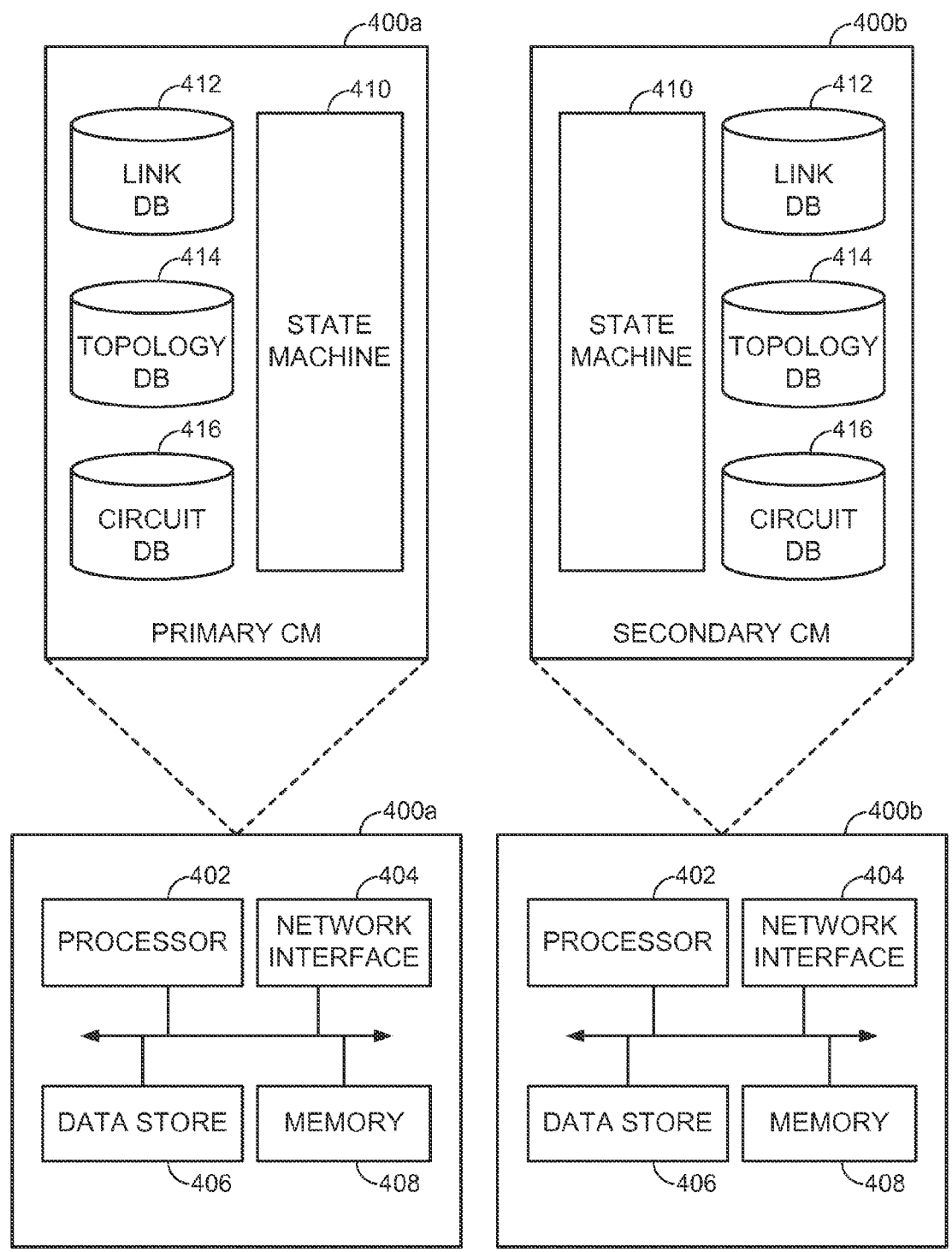
FIG. 4 depicts a block diagram of exemplary control modules in the network element of FIG. 3.

FIG. 4 depicts exemplary control modules 400a, 400b configured to perform control plane processing in the OTN 204. For example, the control plane can control GMPLS, MPLS, and the like, as described herein. The control modules 400a, 400b can include a processor 402 which is a hardware device for executing software instructions such as those which operate the control plane. The processor 402 can be any custom made or commercially available processor, a central processing unit (CPU), an auxiliary processor among several processors associated with the control modules 400a, 400b, a semiconductor-based microprocessor (in the form of a microchip or chip set), and/or any device configured to execute software instructions. The processor 402 is configured to execute software stored within memory, to communicate data to and from the memory, and to control operations of the control modules 400a, 400b pursuant to the software instructions.

The control modules 400a, 400b can also include a network interface 404, a data store 406, a memory 408, and the like, all of which can be coupled therebetween and with the processor 402. The network interface 404 can be used to enable the control modules 400a, 400b to communicate with a network, such as to communicate control plane information with other control modules, with a management system, with a controller and/or a proxy, and the like. The network interface 404 can include, for example, an Ethernet card (e.g., 10BaseT, Fast Ethernet, Gigabit Ethernet) and/or a wireless local area network (WLAN) card (e.g., 802.11a/b/g/n/ac). The network interface 404 can include address, control, and/or data connections to enable communications via the network.

The data store 406 can be used to store data, such as control plane information, provisioning data, OAM&P data, etc. The data store 406 can include volatile memory elements (e.g., random access memory (RAM, such as DRAM, SRAM, SDRAM, and the like)), nonvolatile memory elements (e.g., ROM, hard drive, tape, CD-ROM, and the like), and combinations thereof. Moreover, the data store 406 can incorporate electronic, magnetic, optical, and/or other types of data storage media.

The memory 408 can include any of volatile memory elements (e.g., random access memory (RAM, such as DRAM, SRAM, SDRAM, etc.)), nonvolatile memory elements (e.g., ROM, hard drive, tape, CD-ROM, etc.), and combinations thereof. Moreover, the memory 408 can incorporate electronic, magnetic, optical, and/or other types of data storage media. Further, the memory 408 can have a distributed architecture, where various components are situated remotely from one another, but can be accessed by the processor 402.

From a logical perspective, each of the control modules 400a, 400b can include a state machine 410, a link database (DB) 412, a topology DB 414, and a circuit DB 416. Generally, the control modules 400a, 400b execute software, perform processes, execute algorithms, etc. to control configurable features of a network, such as automating discovery of network elements, capacity on links, port availability on the network elements, connectivity between ports; dissemination of topology and bandwidth information between the network elements; calculation and creation of paths for connections; network level protection and restoration; and the like. The control modules 400a, 400b can be configured in a redundant configuration (e.g., 1+1, 1:1, etc.).

The state machine 410 is configured to implement at least a part of the methods described herein. The DBs 412, 414, 416 can be stored in the memory 408 and/or the data store 406. The link DB 412 can include updated information about each link in a network. The topology DB 414 can include updated information about the network topology, and the circuit DB 416 can include a listing of terminating circuits and transiting circuits in an optical transport system where the control modules 400a, 400b are located.

The control modules 400a, 400b can utilize control plane mechanisms to maintain the DBs 412, 414, 416. For example, messages can be used to discover and verify neighboring ports, nodes, protection bundles, boundary links, and the like. Also, the DBs 412, 414, 416 can share topology state messages to maintain identical data. Collectively, the state machine 410 and the DBs 412, 414, 416 can advertise a normalized energy consumption indicator, topology information, capacity availability, and provide connection management (provisioning and restoration). For example, each link in a network can have various attributes associated with it such as, for example, a normalized energy consumption indicator, line protection, available capacity, total capacity, administrative weight, protection bundle identification, delay, designation of boundary link, and the like. The state machine 410 and the DBs 412, 414, 416 can be configured to provide automated end-to-end provisioning. For example, a route for a connection can be computed from originating node to terminating node and optimized using a normalized energy consumption indicator and/or Dijkstra's Algorithm, i.e. shortest path from source to a destination based on the least administrative cost or weight, subject to a set of user-defined constraints.

The control modules 400a, 400b also can be configured to communicate with other control modules in other nodes in the OTN 204. This communication can be either in-band or out-of-band. For SONET networks and similarly for SDH networks, the control modules 400a, 400b can use standard or extended SONET line (or section) overhead for in-band signaling, such as the Data Communications Channels (DCC).

Out-of-band signaling can use an overlaid Internet Protocol (IP) network such as, for example, User Datagram Protocol (UDP) over IP.

Figure 5:
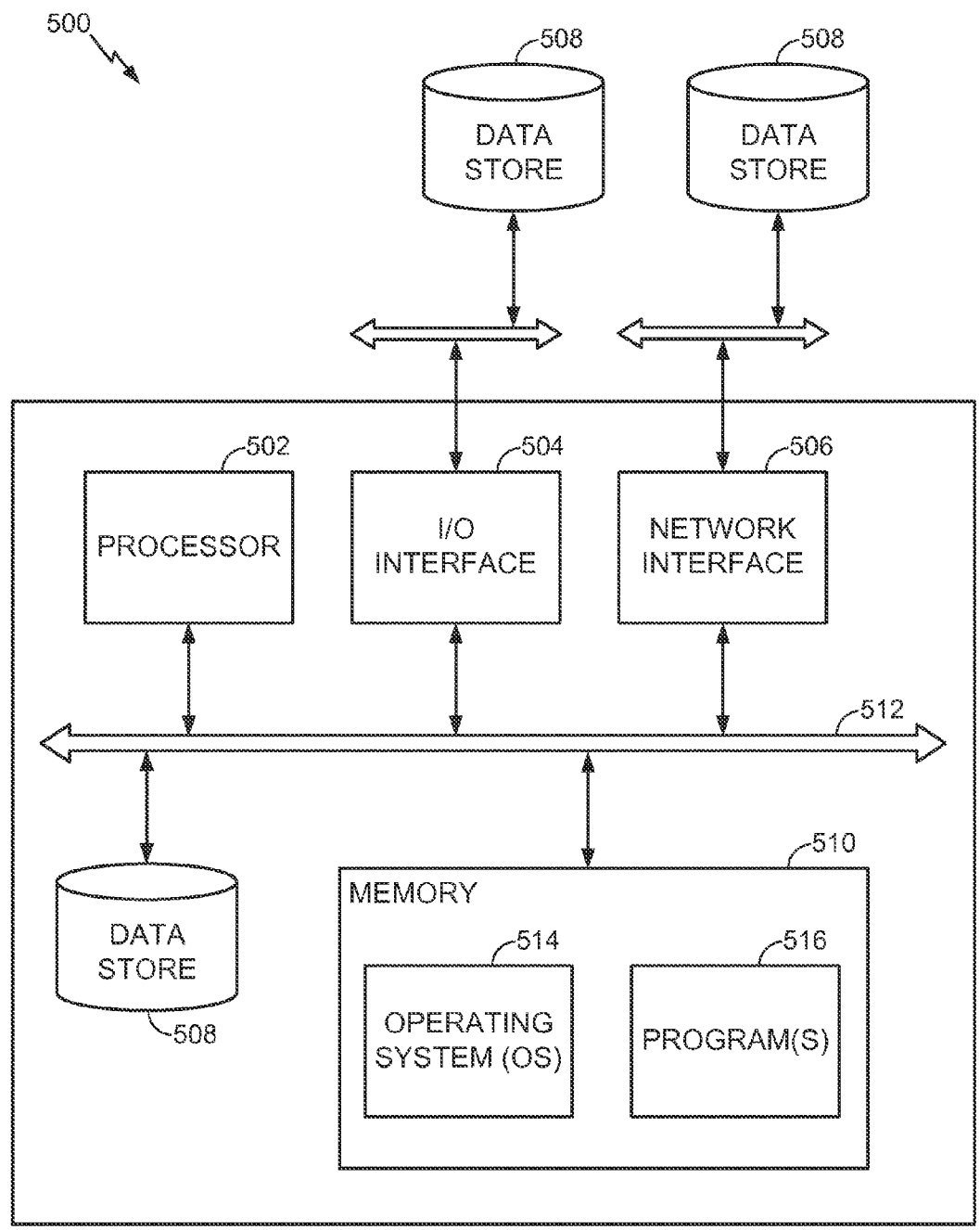
FIG. 5 depicts an exemplary diagram of a server which can be used as a central controller of the OTN of FIG. 2.

FIG. 5 depicts an exemplary diagram of a server 500 which can be used as the central controller 202 described herein. The server 500 can be a digital computer that, in terms of hardware architecture, includes a processor 502, an input/output (I/O) interface 504, a network interface 506, a data store 508, a memory 510, and/or a local interface 512. FIG. 5 depicts the server 500 in an oversimplified manner, and a practical embodiment can include additional components and processing logic to support conventional operating features that are not described in detail herein.

The processor 502 is a hardware device that can execute software instructions. The processor 502 can be any custom made or commercially available processor, a central processing unit (CPU), an auxiliary processor among several processors associated with the server 500, a semiconductor-based microprocessor (in the form of a microchip or chip set), or generally any device for executing software instructions. The processor 502 is configured to execute software stored within the memory 510, to communicate data to and from the memory 510, and to generally control operations of the server 500 pursuant to the software instructions.

The I/O interface 504 can receive user input from and/or provide system output to one or more devices and/or components. The I/O interface 504 can receive user input via, for example, a keyboard, touch pad, and/or a mouse. System output can be provided via a display device and/or a printer (not shown). The I/O interface 504 can include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, a universal serial bus (USB) interface and/or the like.

The network interface 506 enables the server 500 to communicate with a network, such as with CE routers and/or the OTN 204. The network interface 506 can include, for example, an Ethernet card or adapter (e.g., 10BaseT, Fast Ethernet, Gigabit Ethernet, 10 GbE, and/or the like) and/or a wireless local area network (WLAN) card and/or adapter (e.g., 802.11a/b/g/n/ac). The network interface 506 can provide address, control, and/or data communications to enable communications on the network.

Further, a data store 508 can be used to store data. The data store 508 can include volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 can incorporate electronic, magnetic, optical, and/or other types of storage media. In one example, the data store 508 can be a part of the server 500 such as, for example, an internal hard drive connected to the local interface 512 in the server 500. Additionally in another embodiment, the data store 508 is external to the server 500 such as, for example, an external hard drive connected to the I/O interface 504 (e.g., via a SCSI or a USB connection). In a further embodiment, the data store 508 can be coupled to the server 500 through a network, such as, for example, a network attached file server.

The memory 510 can include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 can incorporate electronic, magnetic, optical, and/or other types of storage media. The memory 510 can have a distributed architecture, where various components are situated remotely from one another, but can be accessed by the processor 502. Software stored in memory 510 can include one or more software programs, each of which includes an ordered listing of executable instructions for implementing logical functions. The software in the memory 510 includes a suitable operating system (O/S) 514 and one or more programs 516. The operating system 514 controls execution of other computer programs, such as the one or more programs 516, and can provide scheduling, input-output control, file and data management, memory management, and communication control and related services. The one or more programs 516 can be configured to implement at least a part of the processes, algorithms, methods, techniques, etc. described herein.

The local interface 512 can couple the processor 502, the input/output (I/O) interfaces 504, the network interface 506, the data store 508, and/or the memory 510. The local interface 512 can be, for example but not limited to, a bus or other wired or wireless connections. The local interface 512 can have additional elements, which are omitted herein for simplicity, such as controllers, buffers (caches), drivers, repeaters, and receivers, among many others, to enable communications. Further, the local interface 512 can provide address, control, and/or data communications to enable communications among the processor 502, the input/output (I/O) interfaces 504, the network interface 506, the data store 508, and the memory 510.

The following section describes describe details of exemplary message encapsulation procedures for OSPF-TE and ISIS-TE protocol extensions that can be used to distribute energy efficiency information of a switching node.

1. Switching System Energy Efficiency Management Capability Discovery

In MPLS/GMPLS Traffic Engineering networks, it's often desirable to know if certain LSR nodes are capable of performing energy efficiency management and energy efficiency information propagation. Provided are protocol extensions of OSPF-TE and ISIS-TE to advertise such capabilities. The OSPF-TE and ISIS-TE speaking LSRs learn from such advertisements, if one or more neighbors are capable of propagating control plane and/or data plane Energy Efficiency information. A Head-end LSR(s) would use such information during path computation, to determine if a tunnel path is feasible that would include energy efficiency management capable LSR nodes, if a tunnel path is feasible that would exclude currently known energy inefficient LSR(s), and/or if a tunnel path is feasible that would include currently known energy efficient LSR(s). A Head-end LSR can use such information e.g. energy efficiency management capability and already energy inefficient nodes, as constraints to find feasible path(s) either during new tunnel setup or existing tunnel re-route or re-optimization. Existing IETF standard RFC 4970, defines the details of OSPF based Router Capability advertisements. Also, existing IETF standard RFC 4971, defines the details of IS-IS based Router Capability advertisements. Thus, provided is: (1) a new TLV for OSPF, as TE Node Energy Efficiency Management Capability Descriptor (EEMCD) TLV, to be carried within the Router Information LSA, and (2) a new sub-TLV for IS-IS, as TE Node Energy Efficiency Management Capability Descriptor (EEMCD) sub-TLV, to be carried within the IS-IS Capability TLV.

2. IGP-TE Node Energy Efficiency Management Capability Descriptor

The TE-capable LSR nodes might be able to detect and propagate energy efficiency status of data plane and control plane, during heavy traffic load situation. Such TE LSR(s) should advertise their capabilities to neighbors, after adjacency is established. LSR nodes that receive such capability information, can optimally compute LSP paths either excluding such nodes or including those nodes.

2.1 TE Node EEMCD TLV Value Bit Flags

The TE Node EEMCD TLV Value contains a set of bit flags, where each bit represents a specific TE energy efficiency management capability. Defined are Energy Efficiency Management capabilities.

Bit EEM Capability Type

===

0 D bit—Data Plane Energy Efficiency Advertisement. When set, this flag indicates that the LSR is capable of advertising data plane energy efficiency status.

1 C bit—Control Plane Energy Efficiency Advertisement. When set, this flag indicates that the LSR is capable of advertising control plane Energy Efficiency status.

2 P bit—Primary LSP Energy Efficiency Repair Advertisement. When set, this flag indicates that the LSR is capable of Energy Efficiency repair of primary path, i.e. capable of protection switchover when a protected primary path is congested at downstream LSR.

3 B bit—Backup LSP Energy Efficiency Reroute Advertisement. When set, this flag indicates that the LSR is capable of Energy Efficiency repair of backup path, i.e. capable of rerouting backup path, to an alternate path that is not congested at downstream LSR(s).

4 S bit—FRR Bypass Tunnel Energy Efficiency Reroute Advertisement. When set, this flag indicates that the LSR is capable of Energy Efficiency repair of Bypass Tunnel path, i.e. capable of rerouting Bypass Tunnel, to an alternate path that is not congested at downstream LSR(s).

2.2 OSPF-TE Node Energy Efficiency Management Capability Descriptor

The OSPF-TE Node Energy Efficiency Management Capability Descriptor (OSPF-TE NEEMCD) TLV is a variable length TLV that contains a triplet {Type, Length, Value}, where 'Type' field is 2 octets, Length field is also 2-octets and the 'Value' field is multiples of 32-bit words. The Value filed is an array of Bit flags as defined above. The OSPF-TE NEEMCD TLV has the same format as the TLV used in Traffic Engineering extension of OSPF [RFC3630]. The NEEMCD TLV is carried as an optional TLV within an OSPF Router Information LSA, which is defined in IETFC RFC4970.

2.2.1 OSPF-TE NEEMCD TLV Structure

The OSPF-TE NEEMCD TLV has the following format:
TYPE: 32774 (Taken from the experimental sub-range for types as documented in RFC 4970. This sub-range is not controlled by the LANA registry).
LENGTH: Variable (Multiple of 4).
VALUE: Array of units of 32 Bit Flags numbered from the MSB bit as Bit zero, where each Bit Flag represents a TE node's Energy Efficiency management capability.

2.3 ISIS-TE Node Energy Efficiency Management Capability Descriptor

The ISIS-TE Node Energy Efficiency Management Capability Descriptor (ISIS-TE NEEMCD) sub-TLV is a variable length TLV that contains a triplet {Type, Length, Value}, where 'Type' field is 1 octet, Length field is 1 octet specifying the length of the value field, and the 'Value' field is multiples of octets. The Value field contains an array of Bit flags as defined above. The ISIS-TE NEEMCD sub-TLV has the same format as the sub-TLV used in Traffic Engineering extension of IS-IS [RFC3784]. The ISIS-TE NEEMCD sub-TLV is carried as an optional sub-TLV within an IS-IS CAPABILITY TLV, which is defined in IETFC RFC4971.

2.3.1 ISIS-TE NEEMCD Sub-TLV Structure

The ISIS-TE NEEMCD sub-TLV has the following format:
TYPE: XX (Value to be assigned from the current unused sub-range for types as documented in RFC 5305).
LENGTH: Variable (Multiple of 1).
VALUE: Array of units of 8 Bit Flags numbered from the MSB bit as Bit zero, where each Bit Flag represents a TE node's Energy Efficiency management capability.

2.4 IGP-TE Node EEMCD Advertisement Processing

The TE Node EEMCD is advertised by a TE LSR to the TE Node's neighbors via OSPFv2 or OSPV3 Router Capability information advertisement, if the LSR has OSPF adjacency established with the neighbors. However, if the LSR has IS-IS adjacency established with the neighbors, then TE Node EEMCD will be advertized via IS-IS Router Capability information advertisement. When a TE LSR learns EEM capability via the EEMCD advertisement, it CAN use such information as constraints for Path computation, so as to include such EEM capable nodes along the LSP path for new or re-routing Tunnel. When the EEM capability is first configured on a LSR node, the node will advertise EEMCD capability to TE capable neighbors. Subsequently, if the EEM capability configuration of the TE node changes, i.e. capability is disabled or enabled via CLI, then it will re-advertise its updated EEM capability in a new OSPF RI LSA or IS-IS RI LSP, as the case can be. A TE node will also advertise a new OSPF RI LSA or IS-IS RI LSP containing the TE Node EEMCD TLV or sub-TLV, whenever the regular refresh is needed for the OSPF LSA or IS-IS LSP. If a TE LSR does not receive EEMCD advertisement from one or more neighbors, then it will assume those neighbors are not capable of monitoring Energy Efficiency status of the Data Plane or Control Plane, and/or not capable of propagating any Energy Efficiency information via OSPF or IS-IS routing extensions. When an LSR node receives a new or updated EEMCD, via OSPF RI LSA or IS-IS RI LSP, the reach-ability of one or more TE routed destinations CAN be affected due to pre-existing policies or path constraints. Thus, the local TE node CAN schedule CSPF computation to re-validate or re-optimize the TE paths of existing MPLS/GMPLS Tunnels originating from this node.

2.4.1 OSPF-TE Node EEMCD Advertisement Procedure

When OSPF-TE or GMPLS-OSPF-TE extension is used for Traffic engineering in MPLS/GMPLS networks, the LSR nodes will advertise their EEM capabilities via OSPFv2 Router Information LSA, (Opaque type of 4 and Opaque ID of 0) or via OSPFv3 Router Information LSA, (Function code of 12). The LSA transmission and reception procedures will follow those mentioned in RFC 4970. The flooding scope for these LSAs are Area-local and so these should be carried within OSPFv2 Type-10 RI LSA or within OSPFv3 RI LSA, with S1 bit set and the S2 bit cleared. Since the Energy Efficiency measurement and advertisement as proposed in this document is meant only for MPLS/GMPLS traffic engineered networks, unless a routing/switching node is TE capable, the node MUST NOT, advertise EEMCD TLV, within OSPFv2/OSPFv3 Router Information LSA.

2.4.2 ISIS-TE Node EEMCD Advertisement Procedure

When ISIS-TE or GMPLS-ISIS-TE extension is used for Traffic engineering in MPLS/GMPLS networks, the LSR nodes will advertise their EEM capabilities via IS-IS Capability Information TLV. The LSP transmission and reception procedures will follow those mentioned in RFC 4971. The flooding scope for the EEMCD sub-TLV is Area-local and so it should be carried within an IS-IS CAPABILITY TLV with S Flag cleared. Since the Energy Efficiency measurement and advertisement as proposed in this document is meant only for MPLS/GMPLS traffic engineered networks, unless a routing/switching node is TE capable, the node MUST NOT, advertise EEMCD sub-TLV, within IS-IS CAPABILITY TLV.

2.5 Backward Compatibility of EEMCD Advertisement

The EEMCD TLV defined in this document does not introduce any interoperability issues. An OSPFv2/OSPFv3 router that does not support/recognize the EEMCD TLV, would silently ignore the TLV, when received in RI LSA. An IS-IS router that does not support/recognize the EEMCD sub-TLV, would silently ignore the sub-TLV, when received in CAPABILITY TLV of RI LSP. If the EEMCD TLV or EEMCD sub-TLV is absent in a received OSPFv2/OSPFv3 RI LSA or IS-IS CAPABILITY TLV, respectively then the EEM capability of the sending Node is unknown. Reception of an EEMCD TLV or EEMCD sub-TLV CAN trigger CSPF path computation and consequently impact the reach-ability or optimality of TE Tunnels in the MPLS/GMPLS TE networks. However, IP routing is not impacted, since normal SPF calculation for OPSF or IS-IS routing is not affected by receiving any EEMCD TLV or EEMCD sub-TLV.

3.0 Switching System Energy Efficiency Measurement Procedure

In a switching system, "energy efficiency" refers to how well switching functions can perform without consuming much of electrical energy. In other words, how good is the switching system performing with respect to saving electrical energy during the switching system's life cycle of packet switching operations. Consuming less electrical energy implies lower thermal emission and a lower amount of carbon dioxide production. Thus, electrical energy consumption rate directly relates to the environmental pollution, safety and industrial economies. Energy savings and green energy operational environment is the primary focus among the equipment vendors and also for the service providers and network operators at various sectors of telecommunication, data networking and data center or cloud computing networks. Several packet switching hardware equipments including network processors, and general purpose computing processors, including micro-controllers at the present era are already capable of operating in energy saving mode. Many such hardware computing parts can support software-based readability of their electrical energy consumption rate. Some of the hardware processors can also support software based readability of their thermal emission rate. The term energy efficiency primarily means electrical energy efficiency.

3.1 Energy Efficiency Measurement Architecture

For energy efficiency measurement purposes, we define a distributed software agent-based architecture, for the chassis based distributed Ethernet switching platforms. In this architecture a Master Agent is termed as 'Energy Efficiency Management Master (EEM-Master)' which runs on the supervisory control card of a chassis and periodically polls a group of Slave Agent(s). A Slave Agent is termed as 'Energy Efficiency Management Slave (EEM-Slave)' which runs on each Line Card and each Fabric Card. The EEM-Slave in each Line card and Fabric card periodically polls hardware registers and/or memory locations to determine energy consumption or energy efficiency of local hardware components. The EEM-Master in the supervisory control card periodically polls hardware registers and/or memory locations to determine energy consumption or energy efficiency of local hardware components. The architecture uses the consumer/producer model for energy efficiency measurement purposes. In this model, the power supply units are the energy producers or suppliers and the packet switching hardware components are the energy consumers. The architecture also defines an aggregator framework, where the EEM-Master plays the role of an energy efficiency data aggregator. In other words, an EEM-Master in addition to monitoring and measuring energy efficiency of its local supervisory control card, also aggregates the monitored and measured energy efficiency data from other EEM-Slave agents, for collective data maintenance or data reporting purposes. It can be noted that in electrical systems and appliances, energy is conventionally represented as Kilowatt Hour (KWH). However, in this document our focus will be centered about relative energy efficiency calculation, rather than absolute energy measurement. Thus, we express energy efficiency numbers, based on the relative proportion of energy consumed and energy produced, in the switching system.

3.2 Energy Efficiency Measurement Configuration Parameters

In order to monitor and determine the Energy Efficiency status of both data plane and control plane, a switching system needs to be configured with minimum and maximum threshold parameters for the energy resource utilization by switching system. The following configuration parameters are needed for data plane Energy Efficiency status determination.

3.2.1 Data Plane Node Wide Global Energy Efficiency Management

NTh_Min—Minimum threshold for the energy usage count, from node-wide global available energy, at which Energy Efficiency degradation starts. When the energy usage count is below this threshold, the switching data plane is considered energy efficient at the global level.

NTh_Max—Maximum threshold for the energy usage count, from node-wide global available energy. The Energy Efficiency status starts from the minimum threshold and grows up to the maximum threshold. When the usage count exceeds the maximum threshold, the switch is considered 100% energy in-efficient with respect to the global available energy.

3.2.2 Data Plane Per-Link Energy Efficiency Management

Switching hardware CAN support up-to 'Max_Link' number of Link(s).

LTh_Min(L)—Minimum threshold for the energy usage count, from per-Link available energy for Link 'L', where 0<=L<=Max_Link. When the energy usage count is below this threshold, the switching data plane is considered energy efficient at the Link level.

LTh_Max(L)—Maximum threshold for the energy usage count, from per-Link available energy for Link 'L', where 0<=L<=Max_Link. The Energy Efficiency status starts from the minimum threshold and grows up to the maximum threshold. When the usage count exceeds the maximum threshold, the switch is considered 100% energy in-efficient with respect to per-Link available energy.

3.2.3 Control Plane Node Wide Energy Efficiency Control Parameters

The following configuration parameters are needed for control plane Energy Efficiency status determination.

CpuTh_Min—Minimum threshold for the overall percentage energy utilization, by the control plane CPU and peripheral I/O devices.

CpuTh_Max—Maximum threshold for the overall percentage energy utilization, by the control plane CPU and peripheral I/O devices.

3.3 Switching Data Plane Energy Efficiency Measurement Procedure

When a traffic flow is admitted by the switch, the traffic flow consumes processing cycles of switching hardware pipeline(s) along the packet's forwarding data path. These hardware processing cycles will trigger additional electrical energy consumption, due to computational work to be performed by the pipelined processors. We arbitrarily assume that the processing of the traffic flow, consumes available energy in the following proportions:

'Y' number of energy from the per-Link, available energy.
'Z' number of energy from the Node wide global, available energy.

then data plane Energy Efficiency status at that instant can be expressed as follows:

3.3.1 Data Plane Per-Link Energy Efficiency Status Calculation

If Y<LTh_Min(L), then Data Plane Link level energy consumption on Link 'L' is efficient.

If LTh_Min(L)<=Y<=LTh_Max(L), then Data Plane Link level energy consumption on Link 'L' is in-efficient, by a factor of LEEF(L)=[Y−LTh_Min(L)]/[LTh_Max(L)−LTh_Min(L)]. The percentage Energy Efficiency status in this case can be expressed as PLEEI(L)=[LEEF(L)×100] %.

If Y>LTh_Max(L), then Data Plane Link level energy consumption on Link 'L' is considered fully in-efficient, i.e. 100%.

3.3.2 Data Plane Node Wide Global Energy Efficiency Status Calculation

If Z<NTh_Min, then Data Plane node wide global energy consumption is efficient.

If NTh_Min<=Z<=NTh_Max, then Data Plane node wide global energy consumption is in-efficient, by a factor of NEEF=[Z−NTh_Min]/[NTh_Max−NTh_Min]. The percentage Energy Efficiency status in this case can be expressed as PNEEI=[NEEF×100] %.

If Z>NTh_Max, then Data Plane node wide global energy consumption is considered fully in-efficient, i.e. 100%.

3.4 Switching Control Plane Energy Efficiency Measurement Procedure

At present modern Ethernet switching platforms use embedded software infrastructure that is capable of monitoring and calculating percentage utilization of energy by control plane CPU and attached peripheral I/O devices. Thus, if at any instant the overall energy utilization by CPU and peripheral I/O devices, can be expressed as follows:

'C'—percentage utilization of energy by control plane CPU(s) and peripheral I/O devices, then control plane Energy Efficiency status at that instant can be expressed as follows:

If C<CpuTh_Min, then Control Plane CPU energy consumption is efficient.

If CpuTh_Min<=C<=CpuTh_Max, then Control Plane CPU energy consumption is in-efficient, by a factor of CpuEEF=[C−CpuTh_Min]/[CpuTh_Max−CpuTh_Min].

The percentage Energy Efficiency status in this case can be expressed as PCpuEEI=[CpuEEF×100] %.

If C>CpuTh_Max, then Control Plane CPU energy consumption is considered fully in-efficient, i.e. 100%.

3.5 Smoothly Averaged Energy Efficiency Level Measurement

During temporary network failures, software or hardware glitches, one or more traffic flows through the switching systems can experience transient traffic loss, due to congestion overload, queuing drops and excessive transmission delays. However, transient traffic loss can recover and switching delays can return to normalcy, after a network convergence. Thus, if Energy Efficiency level measured during transient excessive Energy consumption situation is instantly advertised to OPSF-TE or ISIS-TE neighbors, then frequent flooding of TE LSA or TE LSPs can contribute to more excessive Energy consumption. As a result of this frequent reroute of MPLS/GMPLS Tunnels over narrowly stable paths can result in further instability of the traffic engineering networks. Provided is a mechanism to calculate the cumulative average value of measured Energy Efficiency levels of various monitored resources during each recurring measurement interval. To compute smooth cumulative average values of the Energy Efficiency level of a switching system resource, over a chosen periodic measurement interval, an Auto-Regressive Moving Average (ARMA) statistical model can be used. An ARMA model usually produces an exponentially weighted moving average (EWMA), $A_{n+1}=\lambda*A_n+(1-\lambda)*A_{n-1}$, where $A_n$ represents n-th iterative averaged value, and $0<\lambda<1$, which is a smoothed quantity as opposed to a spiked uneven data. For numerical computation on digital computers, the above EWMA function can be approximated using a Step function.

4.0 Switching System Energy Efficiency Advertisement Protocol

The switching node will periodically perform Energy Efficiency status monitoring and Energy Efficiency level calculation, for the data plane and/or control plane, if operator has enabled this action via configuration. In the switching system, once the data plane and/or control plane Energy Efficiency level is calculated, this information can be advertised to the routing neighbors of the local node using OSPF-TE and/or ISIS-TE protocol extensions. The switching node can choose not to advertise Energy Efficiency level information to a neighbor, whose EEM capability is unknown. The EEM capability of a OSPF or IS-IS neighboring router is considered unknown, if it had not advertised, the EEMCD TLV in OSPFv2/OSPFv3 RI LSA or not advertised EEMCD sub-TLV in IS-IS CAPABILITY TLV.

4.1 OSPF-TE Extension for Energy Efficiency Advertisement

Provided are new extensions to the OSPF-TE and GMPLS-OSPF-TE's TE LSA advertisement protocols, which are defined in IETF standards, RFC3630, RFC4202, RFC4203. These enhancements to the Traffic Engineering properties of OSPF routing and GMPLS-OSPF routing capable Links can be announced in OSPF-TE LSAs. The TE LSA, which is an opaque LSA with Area flooding scope [RFC3630] has a top-level TLV and one or more nested sub-TLVs in it for extensibility. Both the TLV and nested sub-TLVs are 32-bit aligned. In this document we enhance the existing top-level TLV, viz. Link TLV by adding new sub-TLVs and define a new top-level TLV, 'Extended Node TE Status Attribute' (ENTESA), to support advertisement of switching node's Energy Efficiency status information.

4.1.1 Node Level Energy Efficiency Status Encoding in OSPF-TE

The node level Energy Efficiency status will be encoded in a new TLV, 'Extended Node TE Status Attribute' (ENTESA). This TLV has the following data structure:

TLV TYPE: 2 Octet [32774, TANA registration not required for the experimental range 32768-32777].

TLV Length: 2 Octet indicating total length of a number of optional sub-TLVs.

TLV Value: 8*N Octets of sub-TLVs, of the following types.

4.1.1.1 Node's Data Plane Energy Efficiency Level Indicator Sub-TLV

This sub-TLV contains the Data Plane's node wide global Energy Efficiency level expressed in percentage unit. This sub-TLV is optional and can appear at most once in the 'ENTESA' TLV. This sub-TLV is useful for traffic engineering policy constrained path computation.
sub-TLV TYPE: 2 Octet [32771, TANA registration not required for the experimental range 32768-32777].
sub-TLV Length: 2 Octet (Length of the value field=1).
sub-TLV Value: 4 Octet (Energy Efficiency level value between 0%-100%).

4.1.1.2 Node's Control Plane Processor Energy Efficiency Level Indicator Sub-TLV This sub-TLV contains the Control Plane processor's relative energy efficiency, expressed in percentage unit. This sub-TLV is optional and can appear at most once in the 'ENTESA' TLV. This sub-TLV is useful for traffic engineering policy constrained path computation.
sub-TLV TYPE: 2 Octet [32772, TANA registration not required for the experimental range 32768-32777].
sub-TLV Length: 2 Octet (Length of the value field=1).
sub-TLV Value: 4 Octet (Energy Efficiency level value between 0%-100%).

4.1.2 Link Level Energy Efficiency Status Encoding in OSPF-TE

The Link level Energy Efficiency status will be encoded in new sub-TLVs, of the existing top-level TLV 'Link TLV' (TLV Type 2).

4.1.2.1 Data Plane per-Link Energy Efficiency Level Indicator sub-TLV

This sub-TLV contains the Data Plane's per-Link Energy Efficiency level expressed in percentage unit. This sub-TLV is optional and should appear at most once in a 'Link TLV'. This sub-TLV is useful for traffic engineering policy constrained path computation at Head End LSR. An LSR can also make use of this Energy Efficiency information for Policy based Admission Control of new LSP setup requests and policy based pre-emption of already established LSPs.
sub-TLV TYPE: 2 Octet [32771, TANA registration not required for the experimental range 32768-32777].
sub-TLV Length: 2 Octet (Length of the value field=1).
sub-TLV Value: 4 Octet (Energy Efficiency level value between 0%-100%).

4.2 ISIS-TE Extension for Energy Efficiency Advertisement

Provided are new extensions to the ISIS-TE and GMPLS-ISIS-TE's TE LSP advertisement protocols, which are defined in IETF standard, RFC5305. These enhancements to the Traffic Engineering properties of IS-IS routing and GMPLS-ISIS routing capable Links can be announced in IS-IS Link State Protocol Data Units (LSPs). For traffic engineering purposes, IS-IS LSP is used to carry a top-level TLV and one or more nested sub-TLVs in it for extensibility. In this document we enhance the existing top-level TLV, 'Extended IS Reachability TLV' by adding new sub-TLVs and define a new top-level TLV, 'Extended Node TE Status Attribute' (ENTESA), to support advertisement of switching node's Energy Efficiency status information.

4.2.1 Node Level Energy Efficiency Status Encoding in ISIS-TE

The node level Energy Efficiency status will be encoded in a new TLV, 'Extended Node TE Status Attribute' (ENTESA). This TLV has the following data structure:
TLV TYPE: 1 Octet (Value To be assigned later by TANA).
TLV Length: 1 Octet indicating total length of a number of optional sub-TLVs.
TLV Value: 0-253 octets of sub-TLVs, of the following types.

4.2.1.1 Node's Data Plane Energy Efficiency Level Indicator Sub-TLV

This sub-TLV contains the Data Plane's node wide global Energy Efficiency level expressed in percentage unit. This sub-TLV is optional and can appear at most once in the 'ENTESA' TLV. This sub-TLV is useful for traffic engineering policy constrained path computation.
sub-TLV TYPE: 1 Octet (Experimental Value=1)
sub-TLV Length: 1 Octet (Length of the value field=1).
sub-TLV Value: 1 Octet (Energy Efficiency level value between 0%-100%).

4.2.1.2 Node's Control Plane Processor Energy Efficiency Level Indicator Sub-TLV This sub-TLV contains the Control Plane processor's relative energy efficiency, expressed in percentage unit. This sub-TLV is optional and can appear at most once in the 'ENTESA' TLV. This sub-TLV is useful for traffic engineering policy constrained path computation.
sub-TLV TYPE: 1 Octet (Experimental Value=2)
sub-TLV Length: 1 Octet (Length of the value field=1).
sub-TLV Value: 1 Octet (Energy Efficiency level value between 0%-100%).

4.2.2 Link Level Energy Efficiency Status Encoding in ISIS-TE

The Link level Energy Efficiency status will be encoded in new sub-TLVs, of the existing top-level TLV 'Extended IS Reachability TLV' (TLV Type 22).

4.2.2.1 Data Plane Per-Link Energy Efficiency Level Indicator Sub-TLV

This sub-TLV contains the Data Plane's per-Link Energy Efficiency level expressed in percentage unit. This sub-TLV is optional and should appear at most once in each 'Extended IS Reachability TLV'. This sub-TLV is useful for traffic engineering policy constrained path computation at Head End LSR. An LSR can also make use of this Energy Efficiency information for Policy based Admission Control of new LSP setup requests and policy based pre-emption of already established LSPs.
sub-TLV TYPE: 1 Octet (To be assigned from the unused range [23,249] by LANA later)
sub-TLV Length: 1 Octet (Length of the value field=1).
sub-TLV Value: 1 Octet (Energy Efficiency level value between 0%-100%).

4.3 Energy Efficiency Status Advertisement Scaling and Performance

Whenever the periodic Energy Efficiency monitor detects a change in the Energy Efficiency level, as calculated based on the comparison of switching system's energy usage against the pre-defined minimum and maximum thresholds the OSPF-TE LSA or ISIS-TE LSP origination would be triggered inside the routing/switching system. However, not every change in the Energy Efficiency level, need to be flooded via OSPF-TE LSA or ISIS-TE LSP. The originations of TE LSA(s) or TE LSP(s) should be rate limited to one, per certain configured time interval. When large number of MPLS or GMPLS traffic engineered Tunnels with bandwidth reservation, are established or destroyed in the switching system, the OSPF-TE and ISIS-TE protocols would be required to flood large number of traffic engineering LSA(s)/LSP(s) throughout the TE area. Also during network outage in terms of Link going down or node going down, the Head End LER will be busy doing many CSPF computations and tunnel re-route or re-optimization signaling. This triggers OSPF-TE LSA or ISIS-TE LSP flooding with up-to-date TE Link properties, which can contribute to the further elevated level of congestion and consequential excessive energy usage at data plane or control plane or both, resulting in OSPF or IS-SIS PDU drops. Thus, in order to achieve a scalable performance and robust behavior of switching system, to avoid excessive energy usage, caused by traffic congestion, OSPF and IS-IS control packets should be given prioritized treatment via DSCP packet marking and PHB scheduling as recommended in IETF RFC 4222. To reduce the excessive Energy usage caused by the overhead of LSA or LSP retransmission, exponential back-off algorithm should be used for the retransmission interval computation as recommended in IETF RFC 4222.

4.4 LSR Node Behavior During Energy Efficiency Advertisement

After receiving OSPF-TE LSA or ISIS-TE LSP advertisements, an LSR node should not attempt to re-route or re-optimize all Tunnel paths simultaneously, as it might trigger heavy load on control plane processor or memory, contributing to the further Energy in-efficiency level elevation at the local LSR node. Thus, LSR nodes should be able to throttle the maximum number of LSPs that can be re-optimized or re-routed after a hold down timer. Also, the maximum number of new LSP signaling setup(s) or routing adjacency establishment at a LSR node should be throttled.

Figure 6A:
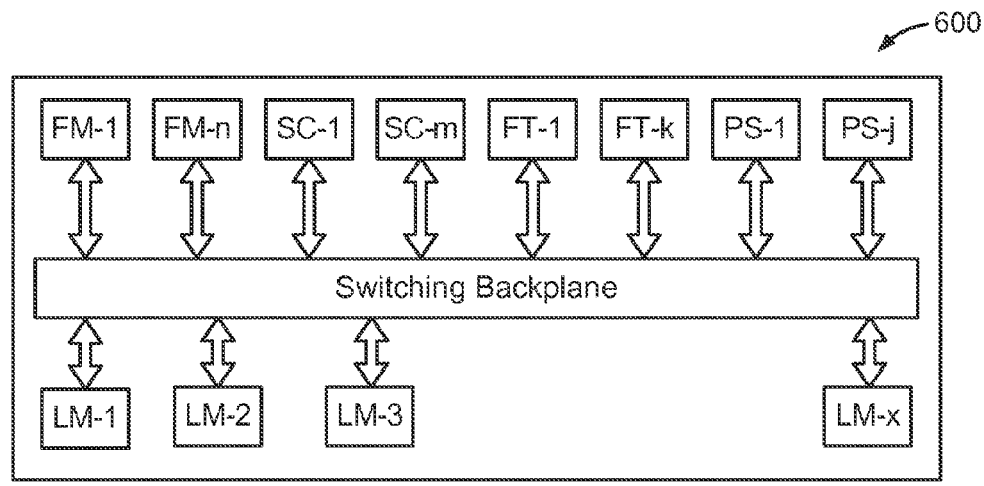
FIG. 6A depicts an exemplary switching system congestion management interaction diagram.

FIG. 6A depicts an exemplary switching system energy efficiency management interaction diagram 600. FIG. 6 depicts a distributed chassis based, switching system's internal block diagram depicting the control path connections of 'n' number of Fabric Modules (FM), 'm' number of Supervisory Cards (SC), 'k' number of Fan Trays (FT), 'j' number of Power Supply Modules (PS) and 'x' number of Line Modules (LM), with the switch backplane.

Fabric Module (FM)—A data plane sub-system which usually consists of H/W switching crossbars and is responsible for switching user's traffic through a switching system, from ingress LM to egress LM.

Supervisory Card (SC)—A control plane sub-system that is responsible for management and supervisory control of the entire switching system and runs various embedded S/W applications including routing, signaling, network management, S/W image loader, system health check, system status monitoring applications, e.g. electrical voltage monitor, temperature monitor etc.

Fan Tray (Cooling Sub-System)—An array of FANs responsible for generating cooling for various H/W components and runs under the control of SC(s).

Power Supply Module—An UPS responsible for supplying electrical power for the switching system.

Line Module—A data plane sub-system which usually consist of Network Processor Units (NPU), Traffic Management H/W Chips, control processor(s) and performs packet forwarding for user's traffic through the switching system.

Figure 6B:
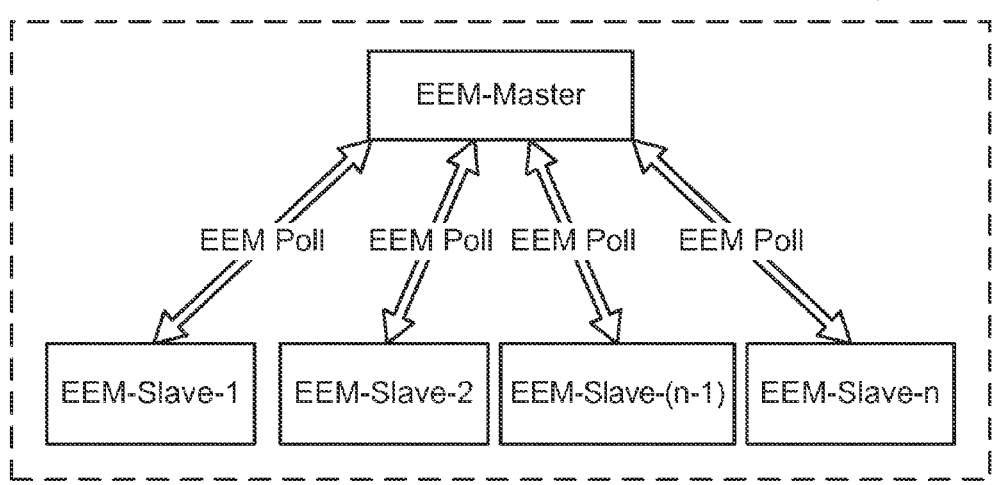
FIG. 6B depicts an exemplary switching system's logical block diagram.

FM-y=>y-th Fabric Module.
SC-y=>y-th Supervisory Card.
FT-y=>y-th Fan Tray (Cooling System).
PS-y=>y-th Power Supply Module.
LM-y=>y-th Line Module FIG. 6B depicts an exemplary switching system's logical block diagram 625 including energy efficiency management poll requests from master to slaves.

EEM-Master—An Energy Efficiency Management (EEM) S/W component that runs on a Supervisory Card and periodically polls the EEM-Salve components that run on every Line Module.

EEM-Slave—A Energy Efficiency Management (EEM) S/W component that runs on every Line Module, and is responsible for monitoring and detecting Energy Efficiency status of packet processing resources inside the Line module and Fabric module.

EEM Poll—EEM-Master periodically sends a poll request message to fetch the monitored and calculated Energy Efficiency level from each EEM-Slave on every Line Module, and fabric module in the switching system.

Figure 6C:
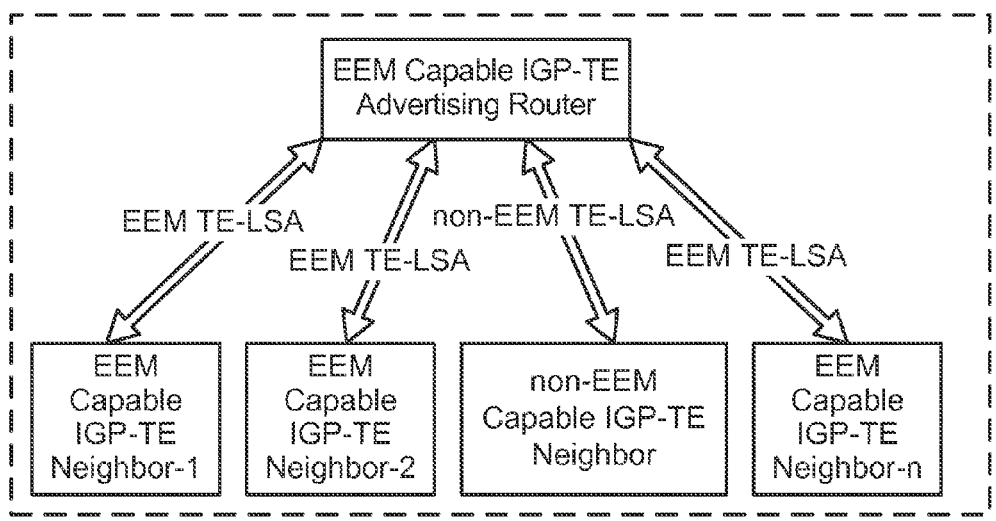
FIG. 6C depicts an exemplary logical block diagram.

FIG. 6C depicts an exemplary logical block diagram 650 showing interactions of IGP-TE (OSPF-TE or ISIS-TE) protocol in the local switching node with 'n' number of IGP-TE speaking neighbor switches, such as IGP-TE LSA advertising including energy efficiency management information.

EEM-IGP-TE-Router—Local router/switch advertising Energy Efficiency Management (EEM) information via IGP-TE extended LSA.

EEM-IGP-TE-Neighbor—Neighbor router/switch receiving Energy Efficiency Management information via extended IGP-TE LSA.

Further, the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

At least a portion of the methods, sequences and/or algorithms described in connection with the embodiments disclosed herein may be embodied directly in hardware, in a software module executed by a processor (such as a special-purpose processor), or in a combination of the two. In an example, a processor includes multiple discrete hardware components. A software module may reside in a random access (RAM) memory, a flash memory, a read only memory (ROM), an electrically erasable programmable read only memory (EEPROM), an erasable programmable read only memory (EPROM), a register, a hard disk, a removable disk, a compact disk read only memory (CD-ROM), and/or any other form of storage medium known in the art. An exemplary storage medium can be coupled to the processor such that the processor can read information from, and write information to, the storage medium. In an alternative, the storage medium may be integral with the processor.

Further, many embodiments are described in terms of sequences of actions to be performed by, for example, elements of a computing device. Various actions described herein can be performed by a specific circuit (e.g., an application specific integrated circuits (ASICs)), by program instructions being executed by one or more processors, or by a combination of both. Additionally, the actions described herein can be embodied entirely within any form of computer readable storage medium storing a corresponding set of computer instructions that upon execution would cause an associated processor (such as a special-purpose processor) to perform the functionality described herein. Alternatively, at least a part of the methods described herein can be implemented by a state machine that has no stored program instructions. Thus, the various aspects of the invention may be embodied in a number of different forms, all of which have been contemplated to be within the scope of the claimed subject matter. In addition, for each of the embodiments described herein, a corresponding circuit of any such embodiments may be described herein as, for example, "logic configured to" perform a described action.

An embodiment of the invention can include a computer readable media embodying a method described herein. Accordingly, the invention is not limited to illustrated examples and any means for performing the functionality described herein are included in embodiments of the invention.

The disclosed devices and methods can be designed and can be configured into a computer-executable file that is in a Graphic Database System Two (GDSII) compatible format, an Open Artwork System Interchange Standard (OASIS) compatible format, and/or a GERBER (e.g., RS-274D, RS-274x, etc.) compatible format, which are stored on a non-transitory (i.e., a non-transient) computer-readable media. The file can be provided to a fabrication handler who fabricates with a lithographic device, based on the file, an integrated device. In an example, the integrated device is on a semiconductor wafer. The semiconductor wafer can be cut into a semiconductor die and packaged into a semiconductor chip. The semiconductor chip can be employed in a device described herein (e.g., a mobile device).

Embodiments can include a non-transitory (i.e., a non-transient) machine-readable media and/or a non-transitory (i.e., a non-transient) computer-readable media embodying instructions which, when executed by a processor (such as a special-purpose processor), transform a processor and any other cooperating devices into a machine configured to perform at least a part of a function described hereby and/or transform a processor and any other cooperating devices into at least a part of the apparatus described hereby.

Nothing stated or illustrated herein is intended to cause a dedication of any component, step, feature, object, benefit, advantage, or equivalent to the public, regardless of whether the component, step, feature, object, benefit, advantage, or the equivalent is recited in the claims.

While this disclosure describes exemplary embodiments of the invention, it should be noted that various changes and modifications could be made herein without departing from the scope of the invention as defined by the appended claims.

What is claimed is:

1. A method for mitigating traffic loss in a multiprotocol label switching (MPLS) network, comprising:
measuring, at a network element, energy utilization of at least one of a line card and a switch fabric card that are configured to carry a traffic engineering (TE) capable link;
converting the energy utilization measurement to a normalized energy consumption indicator for the at least one of the line card and the switch fabric card;
optimizing, based on the normalized energy consumption indicator, a route of a label switched path in the MPLS network so the route avoids the at least one of the line card and the switch fabric card;
advertising the normalized energy consumption indicator to a second network element with a type length value element responsive to the normalized energy consumption indicator crossing a configured threshold, wherein the configured threshold is utilized to minimize advertisements; and
utilizing the normalized energy consumption at the second network element to detect degradation for a protection switchover of the label switched path.

2. The method of claim 1, further comprising, at the second network element:
configuring a point of local repair node to monitor a service quality of the label switched path by checking for the advertised normalized energy consumption indicator;
comparing the advertised normalized energy consumption indicator to a threshold value; and
triggering, if the advertised normalized energy consumption indicator degrades beyond the threshold value, a protection switchover of the label switched path to a back-up route.

3. The method of claim 1, further comprising:
calculating a time delay required to accelerate a fan and cool the at least one of the line card and the switch fabric card below a temperature threshold; and
advertising the time delay to a second network element with a type length value element.

4. The method of claim 1, wherein the optimizing includes rerouting the route using a resource reservation protocol make-before-break procedure or a generalized multiprotocol label switching resource reservation protocol tunnel rerouting.

5. An apparatus configured to mitigate traffic loss in a multi protocol label switching (MPLS) network, comprising:
means for measuring, at a network element, energy utilization of at least one of a line card and a switch fabric card that are configured to carry a traffic engineering (TE) capable link;
means for converting the energy utilization measurement to a normalized energy consumption indicator for the at least one of the line card and the switch fabric card;
means for optimizing, based on the normalized energy consumption indicator, a route of a label switched path in the MPLS network so the route avoids the at least one of the line card and the switch fabric card;
means for advertising the normalized energy consumption indicator to a second network element with a type length value element responsive to the normalized energy consumption indicator crossing a configured threshold, wherein the configured threshold is utilized to minimize advertisements; and
means for utilizing the normalized energy consumption at the second network element to detect degradation for a protection switchover of the label switched path.

6. The apparatus of claim 5, further comprising:
means for calculating a time delay required to accelerate a fan and cool the at least one of the line card and the switch fabric card below a temperature threshold; and
means for advertising the time delay to the second network element with the type length value element.

7. The apparatus of claim 5, wherein the means for optimizing includes rerouting the route using a resource reservation protocol make-before-break procedure or a generalized multiprotocol label switching resource reservation protocol tunnel rerouting.

8. The apparatus of claim 5, wherein the means for optimizing is integrated with at least one of an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, and an aggregation platform extension device, and/or a network element configured to change Operations, Administration, and Maintenance (OAM) attributes.

9. An apparatus configured to mitigate traffic loss in a multiprotocol label switching (MPLS) network, comprising a processor configured to:
measure, at a network element, energy utilization of at least one of a line card and a switch fabric card that are configured to carry a traffic engineering (TE) capable link;

convert the energy utilization measurement to a normalized energy consumption indicator for the at least one of the line card and the switch fabric card;

optimize, based on the normalized energy consumption indicator, a route of a label switched path in the MPLS network so the route avoids the at least one of the line card and the switch fabric card;

advertise the normalized energy consumption indicator to a second network element with a type length value element responsive to the normalized energy consumption indicator crossing a configured threshold, wherein the configured threshold is utilized to minimize advertisements; and utilize the normalized energy consumption at the second network element to detect degradation for a protection switchover of the label switched path.

10. The apparatus of claim 9, wherein the processor is further configured to:

calculate a time delay required to accelerate a fan and cool the at least one of the line card and the switch fabric card below a temperature threshold; and advertise the time delay to the second network element with the type length value element.

11. The apparatus of claim 9, wherein the optimizing includes rerouting the route using a resource reservation protocol make-before-break procedure or a generalized multiprotocol label switching resource reservation protocol tunnel rerouting.

12. The apparatus of claim 9, wherein the processor is integrated with at least one of an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, and an aggregation platform extension device, and/or a network element configured to change Operations, Administration, and Maintenance (OAM) attributes.

13. A non-transitory computer-readable medium, comprising:

instructions stored thereon that, if executed by a processor, cause the processor to:

measure, at a network element, energy utilization of at least one of a line card and a switch fabric card that are configured to carry a traffic engineering (TE) capable link;

convert the energy utilization measurement to a normalized energy consumption indicator for the at least one of the line card and the switch fabric card;

optimize, based on the normalized energy consumption indicator, a route of a label switched path in the MPLS network so the route avoids the at least one of the line card and the switch fabric card;

advertise the normalized energy consumption indicator to a second network element with a type length value element responsive to the normalized energy consumption indicator crossing a configured threshold, wherein the configured threshold is utilized to minimize advertisements; and utilize the normalized energy consumption at the second network element to detect degradation for a protection switchover of the label switched path.

14. The non-transitory computer-readable medium of claim 13, wherein the instructions, if executed by a processor, further cause the processor to:

calculate a time delay required to accelerate a fan and cool the at least one of the line card and the switch fabric card below a temperature threshold; and advertise the time delay to the second network element with the type length value element.

15. The non-transitory computer-readable medium of claim 13, wherein the optimizing includes rerouting the route using a resource reservation protocol make-before-break procedure or a generalized multiprotocol label switching resource reservation protocol tunnel rerouting.

16. The non-transitory computer-readable medium of claim 13, wherein the processor is integrated with at least one of an optical transport network (OTN) device, a reconfigurable optical switch, a Synchronous Optical Network (SONET) device, a Synchronous Digital Hierarchy (SDH) network device, an Intelligent Ethernet demarcation device, an inter-carrier demarcation device, a media conversion device, an edge router, and an aggregation platform extension device, and/or a network element configured to change Operations, Administration, and Maintenance (OAM) attributes.

* * * * *